United States Patent [19]

Crespi

[11] Patent Number: 5,308,714
[45] Date of Patent: * May 3, 1994

[54] METHOD FOR PREVENTING GAS FORMATION IN ELECTROCHEMICAL CELLS

[75] Inventor: Ann M. Crespi, Minneapolis, Minn.

[73] Assignee: Medtronic, Inc., Minneapolis, Minn.

[*] Notice: The portion of the term of this patent subsequent to Jan. 19, 2010 has been disclaimed.

[21] Appl. No.: 917,541

[22] Filed: Jul. 21, 1992

Related U.S. Application Data

[63] Continuation-in-part of Ser. No. 840,224, Feb. 24, 1992, Pat. No. 5,180,642.

[51] Int. Cl.$^5$ .................................. H01M 6/14
[52] U.S. Cl. ............................... 429/59; 429/194; 429/224; 429/218; 429/50
[58] Field of Search ............... 429/218, 224, 194, 197, 429/57, 59, 50

[56] References Cited

U.S. PATENT DOCUMENTS

| | | | |
|---|---|---|---|
| 3,864,168 | 2/1975 | Casey, Jr. et al. | 136/6 LN |
| 4,228,226 | 10/1980 | Christian et al. | 429/194 |
| 4,264,689 | 4/1981 | Moses | 429/194 |
| 4,279,972 | 7/1981 | Moses | 429/50 |
| 4,379,817 | 4/1983 | Kozawa | 429/224 |
| 4,423,125 | 12/1983 | Basu | 429/218 X |
| 4,465,747 | 8/1984 | Evans | 429/194 |
| 4,478,921 | 10/1984 | Langan | 429/194 |
| 4,662,065 | 5/1987 | Marincic et al. | 298/623.1 |
| 4,786,499 | 11/1988 | Slane et al. | 429/218 X |
| 4,913,988 | 4/1990 | Langan | 429/194 |

*Primary Examiner*—Anthony Skapars
*Attorney, Agent, or Firm*—Daniel W. Latham; Harold R. Patton

[57] ABSTRACT

A non-aqueous electrochemical cell comprising an active metal anode, an organic electrolyte and a cathode comprising a minor amount of $V_6O_{13}$. The resulting cell has been found to be resistant to internal gas generation. The inclusion of $V_6O_{13}$ is particularly useful in lithium/manganese dioxide cells.

9 Claims, 1 Drawing Sheet

METHOD FOR PREVENTING GAS FORMATION IN ELECTROCHEMICAL CELLS

This application is a continuation-in-part of Ser. No. 840,224 filed Feb. 24, 1992, now U.S. Pat. No. 5,180,642.

BACKGROUND OF THE INVENTION

This invention relates to electrochemical cells with a non-aqueous electrolyte which require drying of components (especially cathode components), to remove adsorbed moisture; especially cells with manganese dioxide cathodes and especially hermetically sealed cells for implantable medical applications.

When manganese dioxide is used as a cathode material in hermetically sealed cells it has been noted that the case of the cell can swell from gas production as the cell is discharged. The gas causing the case to swell has been identified as methane. The methane is believed to be formed by the breakdown of electrolyte solvents as the cell is discharged. The ultimate effect of this breakdown and gas formation is that the cell can cease operation over just a few days. This is, of course, a very serious problem when the cell is used in a critical medical device application.

Since moisture contributed to the cell by various cell components has been associated with the gassing problem, one approach to solving this problem has been to dry all cell components and to keep them as dry as possible as the cell is assembled. This is accomplished in the cathode material by heating the cathode material to drive off water and also by strict dryroom handling procedures. However, since manganese dioxide is a highly hygroscopic material, it can be difficult to keep enough moisture out of the cell to prevent cell gassing. Other cathode materials such as titanium dioxide, titanium disulfide, stannous oxide, molybdenum trioxide, vanadium pentoxide, chromic oxide, lead oxide, ferric oxide, silver vanadium oxide, and $CF_x$ may also have the same problem to a lesser extent.

In other approaches to the problem, manganese dioxide has been dehydrated by methods other than heating or prevented from adsorbing moisture. For example, U.S. Pat. No. 4,662,065 to Radek et al. discloses a method for dehydrating manganese dioxide by contacting the manganese dioxide with a liquid desiccant such as thionyl chloride. Or, for example, U.S. Pat. No. 4,379,817 to Kozawa discloses a manganese dioxide cathode in which an organic solvent is vapor-deposited onto the cathode to inhibit adsorption of moisture.

In yet other approaches, the electrolyte has been modified to prevent breakdown by moisture. For example, U.S. Pat. No. 4,279,972 to Moses discloses using an electrolyte salt which has a reduced tendency to produce gassing in manganese dioxide cells (e.g. $LiPF_6$, $LiCF_3SO_3$ and $LiBF_4$) rather than the more conventional choices of $LiAsF_6$, $LiClO_4$, and $LiCF_3CO_2$. Also, for example, U.S. Pat. No. 3,864,168 to Casey et al. discloses a method for reducing the moisture content contributed by organic electrolytes by including in association with the electrolyte a water scavenger such as a hydrophilic zeolite or a hydrophilic cellulosic material. However, it would be desirable to provide the cathode itself with resistance to the release of moisture as the cell is discharged.

U.S. Pat. No. 4,264,689 to Moses discloses lithium nitrate and calcium nitrate as additives to a manganese dioxide cathode which reduces gassing of the cell. However, the additives also have the effect of reducing the reactivity of substantially the entire active cathode surface.

Some cathode additives have been proposed for use in cells with organic electrolytes which are intended to modify the behavior of the cell as it is discharged without significantly altering the electrochemical reaction. For example, U.S. Pat. No. 4,465,747 to Evans discloses the use of cathode additives such as lithium silicate, lithium borate, lithium molybdate, lithium phosphate or lithium tungstate to suppress the buildup of internal impedance in the cell during storage and discharge; U.S. Pat. No. 4,913,988 to Langan, discloses the use of minor amounts of a mixture of lithium carbonate and calcium hydroxide as a cathode additive for manganese dioxide cells; and U.S. Pat. No. 4,478,921 to Langan which discloses the use of manganese carbonate to improve the pulse voltage capability of a manganese dioxide cell. However, none of these additives are said to address the problem of cell gassing.

It is therefore an object of the present invention to provide a cell that is resistant to gassing as the cell is discharged.

It is also an object of the present invention to prevent swelling of hermetically sealed cells due to internal gas pressure.

It is also an object of the present invention to prevent sudden, premature failure of cells due to cell gassing and electrolyte breakdown.

It is also an object of the present invention to provide a cathode composition which is resistant to the release of moisture as the cell is discharged.

SUMMARY OF THE INVENTION

These and other objects are accomplished by the cathode composition and electrochemical cell of the present invention. We have found that in a nonaqueous electrochemical cell having an active metal anode and an organic electrolyte, minor amounts of $V_6O_{13}$ admixed into the cathode material can retard the formation of gasses as the cell is discharged. The present invention is most advantageously used in lithium/manganese oxide cells where the $V_6O_{13}$ provides both reduced cell gassing and additional reactive cathode material.

The $V_6O_{13}$ may be included in the cathode in an amount up to about 40% by weight although lesser amounts are preferred. Preferably, an amount of $V_6O_{13}$ in the range of about 15% to about 35% by weight of the cathode is used.

DETAILED DESCRIPTION OF THE INVENTION

Figure 1:
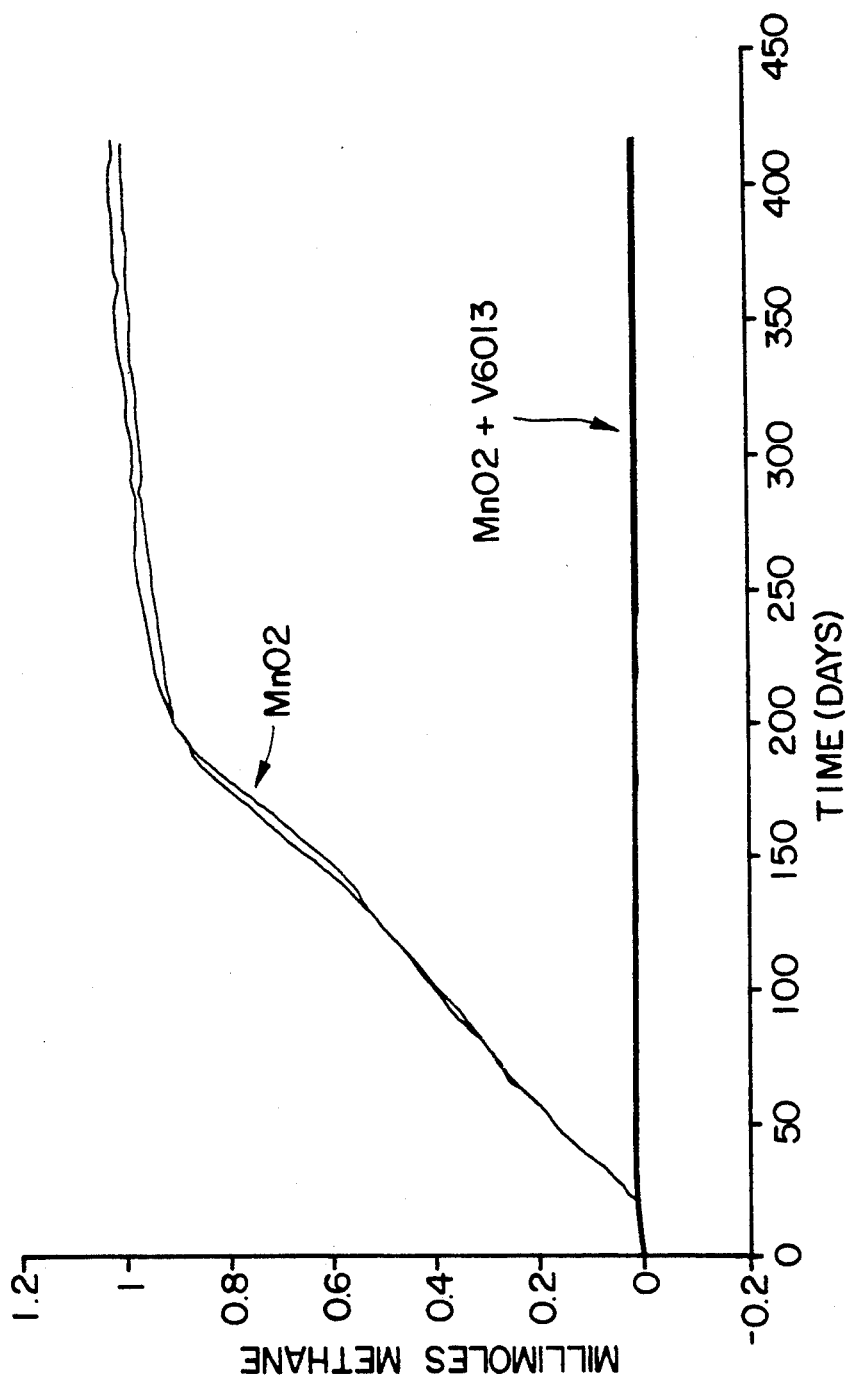
FIG. 1 is a graph showing the gassing characteristics of manganese dioxide cells made according to the present invention in comparison with the gassing characteristics of cells made without $V_6O_{13}$ in the cathode.

The present invention relates to electrochemical cells with active metal anodes and organic electrolytes comprising an organic solvent and an ionizing solute. Active metal anode materials can include, for example, aluminum, the alkali metals, alkaline earth metals and alloys of alkali metals or alkaline earth metals with each other and other metals. The preferred anode materials are lithium, sodium, potassium, calcium and alloys thereof.

The organic solvent can be, for example, 3-methyl-2-oxazolidone, sulfolane, tetrahydrofuran, methyl-substituted tetrahydrofuran, 1,3-dioxolane, propylene carbonate (PC), ethylene carbonate, gamma -butyrolactone, ethylene glycol sulfite, dimethylsulfite, dimethyl sulfoxide or mixtures thereof and also, for example, low viscosity cosolvents such as tetrahydrofuran (THF), methyl-substituted tetrahydrofuran(Met-THF), dioxolane (DIOX), dimethoxyethane (DME), dimethyl isoxazole (DMI), diethyl carbonate(DEC), ethylene glycol sulfite (EGS), dioxane, dimethyl sulfite (DMS) or the like. The ionizing solute can be a simple or double salt or mixtures thereof, for example, $LiCF_3SO_3$, $LiBF_4$, $LiAsF_6$, $LiPF_6$ and $LiClO_4$ which will produce an ionically conductive solution when dissolved in one or more solvents.

In the present invention, minor amounts of $V_6O_{13}$ are admixed into a cathode material to retard the formation of gasses as the cell is discharged. The primary reactive cathode material is preferably manganese dioxide but other cathode materials such as $TiO_2$, $TiS_2$, $SnO$, $MoO_3$, $V_2O_5$, $CrO_3$, $PbO$, $Fe_2O_3$, $Ag_2V_4O_{11}$, and $CF_x$ may also be used.

Generally not more than 40% $V_6O_{13}$ would be used since higher amounts would not be expected to provide much improvement in the suppression of gassing. Preferably, from about 15% to about 35% by weight of the $V_6O_{13}$, most preferably about 20% to about 25%, is mixed into the cathode material. The weight percentage used above and throughout this specification are based on the dry weight of the cathode body. The resulting cathode mixture is shaped into a cathode body in a conventional manner and is inserted along with an anode, a separator and a nonaqueous electrolyte into a cell housing.

The minor amounts of $V_6O_{13}$ material, optionally and preferably along with a binder and a conductive material, may be added to the primary reactive cathode material (e.g. manganese dioxide) utilizing a dry or wet process.

The amount of water present in the manganese dioxide should be reduced before the manganese dioxide can be employed in nonaqueous cells. Thus, the manganese dioxide employed in the present invention is preferably treated so as to remove water prior to being mixed with the $V_6O_{13}$. The water inherently contained in manganese dioxide can be substantially removed by various treatments known in the art. For example, the manganese dioxide can be heated in air or an inert atmosphere at a temperature of 350° C. for about eight hours or at a lower temperature for a longer period of time. Preferably, the manganese dioxide should be heat treated to remove its water content in the crystal lattice to below about 1 weight percent. Even if a wet process is employed in the mixing of $V_6O_{13}$ with manganese dioxide according to the present invention, water will not be reabsorbed into the crystal lattice of the manganese dioxide if it has first been heat treated to remove water. Thus, the subsequent drying steps need not be at such high temperatures. As is employed herein the term "dry process" refers to a process wherein the additives are mixed with the manganese dioxide in a dry form. The term "wet process" refers to a process wherein the $V_6O_{13}$ is mixed with the manganese dioxide in the presence of water. When a dry process is employed dry $V_6O_{13}$ is blended or otherwise directly mixed with dry manganese dioxide. Optionally and preferably, a binder and a conductive material, which materials are also in a dry form, are additionally blended into the dry mix. The dry mix is then formed into a cathode employing molding or other techniques which are well known to those skilled in the art of battery manufacture. The solid cathode materials are in finely divided form so they can be intimately mixed. When a wet mix is employed in the production of a pellet-type cathode, a drying step will typically be required before the cathode mix can be shaped. This drying step typically comprises heating the mixture at a temperature of between about 150° C. and about 285° C. under vacuum until the cathode mix is sufficiently dry. The cathode mixture may then be shaped into a cathode body by means well known to those skilled in the art of battery manufacture.

Binders which may be employed in the cathode of the present invention are polytetrafluoroethylene, ethylene/propylene copolymers and the like. Representative of the conductive materials which may be employed as a conductivity enhancer are graphite, carbon and the like. Acetylene black is a preferred form of carbon. The binders may comprise between about 1 and about 10 weight percent, preferably between about 3 and about 10 weight percent, of the dry cathode mix while the conductive material may comprise between about 1 and about 12 weight percent, preferably between about 3 and about 10 weight percent, of the dry cathode mix.

The present invention is further described below in the context of illustrative examples.

EXAMPLES

Test cells were constructed with a cathode mix of 69.8% manganese dioxide, 22% $V_6O_{13}$, 3.2% Shawinigan carbon, and 5% PTFE; an electrolyte of 1.0M $LiClO_4$ in 60 vol % DME/40 vol % PC; a two piece lithium anode; and a Celgard K465 separator between anode and cathode. The manganese dioxide was first pretreated at 350° C. for 5 hours under air. The PTFE was dispersed in water with a surfactant and mixed with the manganese dioxide, $V_6O_{13}$ and carbon. The resulting mixture was then vacuum baked at 150° C. for 16 hours under vacuum. The dry mix was then ground in a ball mill and pressed in a dye into the desired shape for the cathode. The resulting cathodes were vacuum baked at 150° C. overnight and assembled into the test cells in a glove box. The test cells were hermetically sealed cells having flat sides which when subjected to gas pressure would bulge outward in a manner subject to measurement which thereby indicated the amount of gas generated in the cell. Following cell construction, the cells were pre-discharged for 22 hours at room temperature at 510 ohms and discharged at 37° C. across 4 mA to 2 Ah with weekly thickness measurement. The cells were then relaxed to 75 µA and discharged to 1.8 volts with a weekly thickness measurement. The results of the test are shown on FIG. 1.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

I claim:

1. In a non-aqueous, hermetically sealed electrochemical cell having
   (a) an active metal anode;

(b) an organic electrolyte; and (c) a cathode having a reactive cathode material susceptible to gassing on discharge, wherein the improvement comprises an amount of $V_6O_{13}$ in the range of about 15% up to about 40% of the cathode weight added to the reactive cathode material.

2. The cell of claim 1 wherein the active metal anode is lithium.

3. The cell of claim 1 wherein manganese dioxide is the reactive cathode material.

4. The cell of claim 1 further comprising a conductivity enhancer and a binder in the cathode mixture.

5. The cell of claim 4 wherein the conductivity enhancer is a conductive carbon.

6. The cell of claim 1 wherein the $V_6O_{13}$ is present in the cathode in an amount in the range of about 15% to 35%.

7. A method for preventing gas formation in a nonaqueous electrochemical cell comprising the steps of:

(a) providing a reactive cathode material which is susceptible to gassing during discharge; and (b) adding to the reactive cathode material from about 15% up to about 40% of the cathode weight of $V_6O_{13}$.

8. The method of claim 7 wherein the reactive cathode material is manganese dioxide.

9. The method of claim 7 wherein the $V_6O_{13}$ is present in an amount in the range of about 15% to 35%.

* * * * *